United States Patent [19]
Johnson

[11] Patent Number: 5,373,556
[45] Date of Patent: Dec. 13, 1994

[54] QUICK CONNECT HOUSING COUPLING AND METHOD

[75] Inventor: Jim J. Johnson, Chandler, Ariz.

[73] Assignee: Motorola, Inc., Schaumburg, Ill.

[21] Appl. No.: 997,430

[22] Filed: Dec. 28, 1992

[51] Int. Cl.$^5$ ............................................... H04M 1/00
[52] U.S. Cl. .................................... 379/436; 379/428; 379/447
[58] Field of Search ............... 379/446, 435, 436, 447, 379/428, 442, 443, 444; 248/222.1, 221.4; 439/347, 345, 358, 484

[56] References Cited

U.S. PATENT DOCUMENTS

| | | | |
|---|---|---|---|
| 3,532,823 | 10/1970 | Ellis | 379/447 |
| 4,081,629 | 3/1978 | Benesh et al. | |
| 4,367,003 | 1/1983 | Frantz | 439/347 |
| 4,817,127 | 3/1989 | Chamberlin et al. | 379/436 |

*Primary Examiner*—James L. Dwyer
*Assistant Examiner*—Jack Chiang
*Attorney, Agent, or Firm*—Jeffrey D. Nehr

[57] ABSTRACT

A quick connection system and method for coupling two housings, e.g. a telephone and special function module, includes a bracket having at least one hole. The bracket comprises a slide latch having a slide latch aperture, with the bracket fastened to the first housing base and extending beyond a side of the first housing so that the slide latch and hole overlap the second housing when the second housing is placed adjacent to the first housing. At least one shear boss is affixed to the second housing. A slide latch receptacle is mounted to the second housing, such that the hole on the bracket receives the shear boss and the slide latch on the bracket receives the slide latch receptacle when the second housing is placed adjacent to the first housing. The slide latch can be engaged to rigidly interlock the first housing to the second housing.

19 Claims, 2 Drawing Sheets

QUICK CONNECT HOUSING COUPLING AND METHOD

FIELD OF THE INVENTION

This invention relates in general to coupling of housings and in particular to the coupling of a telephone to a special function module using a quick connection system.

BACKGROUND OF THE INVENTION

The mechanical attachment of two housings, e.g. a telephone to a special function module (SFM), has traditionally been accomplished with conventional bracketing and fasteners to retain the SFM securely in three dimensions relative to the telephone housing. While a traditional bracket fastened exclusively with screws or similar fasteners is acceptable for many applications, such a connection is time consuming to install and requires the use of a tool to either attach or detach the SFM from the telephone.

A need has arisen with the SECTEL ® Multi Media Terminal (MMT) telephone from Motorola for a user-friendly system to connect a SFM to the MMT telephone. There are various SFMs to enhance the telecommunications capabilities of the MMT telephone. A user of a single MMT may wish to use several different SFMs at different times. Even if a first SFM were to be installed at the manufacturing facility or by a dealer, a user would still need to be able to interchange SFMs for additional capability later. In addition, a user may need to periodically remove a SFM for access to a security key port on the MMT telephone.

Therefore, what is needed is a telephone to SFM connection which is easy to make both electrically and mechanically, a connection system which is essentially self-locating and self-aligning, and which results in a coupling having mechanical integrity. The quick connection system must also be relatively inexpensive and be cost effective to produce in significant commercial quantities.

SUMMARY OF THE INVENTION

Accordingly, it is an advantage of the present invention to provide a new and improved apparatus for the quick coupling of two housings. It is a further advantage of the present invention that the method of coupling is user-friendly and results in a secure interlocking with three-dimensional stability.

To achieve these advantages, a quick connection system for coupling a first housing to a second housing is contemplated which includes a bracket having at least one hole. The bracket also comprises a slide latch having a slide latch aperture, with the bracket fastened to a base of the first housing and extending beyond a side of the first housing so that the slide latch and at least one hole overlap the second housing when the second housing is placed adjacent to the first housing. At least one shear boss is affixed to the second housing. A slide latch receptacle is mounted to the second housing, such that the at least one hole on the bracket receives the at least one shear boss and the slide latch on the bracket receives the slide latch receptacle when the second housing is placed adjacent to the first housing. The slide latch can be engaged to rigidly interlock the first housing to the second housing.

To further achieve these advantages, a method for coupling a first housing to a second housing is contemplated, the method comprising the steps of providing a bracket affixed to the first housing, where the bracket has a first hole and a second hole and is positioned so that a slide latch, the first hole, and the second hole extend beyond a side of the first housing. The method includes positioning the second housing relative to the first housing such that a shear boss and a slide latch receptacle, each affixed to the second housing, align with the first hole and the second hole, respectively, of the bracket. The method further includes positioning the second housing relative to the first housing such that the shear boss is inserted into the first hole and the slide latch receptacle is inserted through the second hole. The coupling method also includes sliding the slide latch so that a portion of the slide latch engages the slide latch receptacle extending through the second hole, thereby mechanically locking the first housing adjacent to the second housing.

The above and other features and advantages of the present invention will be better understood from the following detailed description taken in conjunction with the accompanying drawings.

DETAILED DESCRIPTION OF THE PREFERRED EMBODIMENT

Figure 1:
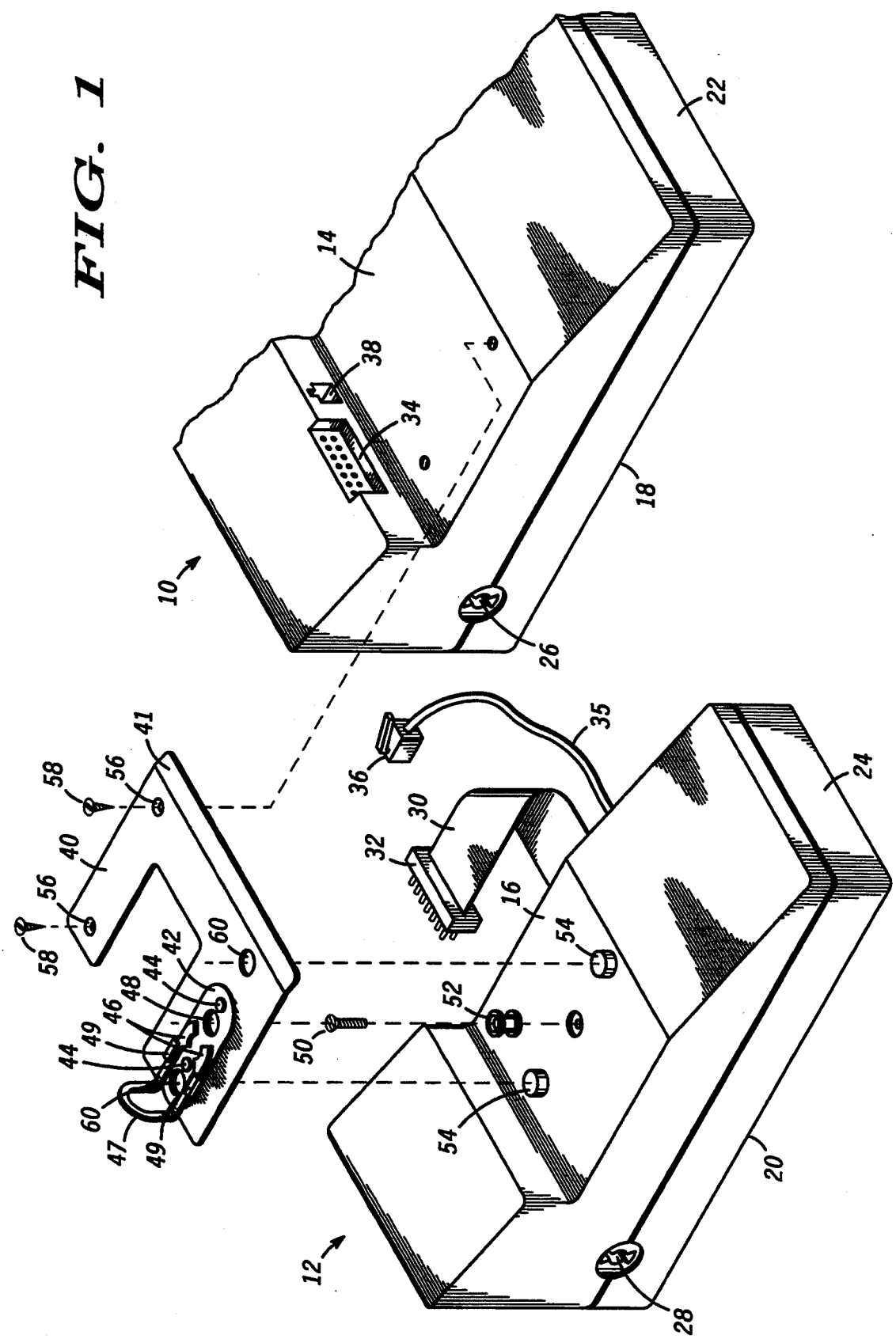
In FIG. 1, there is shown an oblique, exploded view of a quick connect housing coupling and method coupling the undersides of two housings in accordance with a preferred embodiment of the invention.

In FIG. 1, there is shown a quick-connect housing coupling and method in accordance with a preferred embodiment of the invention. Housing 10, which by way of example can be a telephone housing, or more particularly, a SECTEL ® MMT telephone case, is to be coupled to housing 12, which by way of example can be an add-on module to housing 10, or more particularly, a MMT telephone SFM. The bottom 14 of housing 10 and the bottom 16 of housing 12 can be made of cast metal, e.g. aluminum. Alternatively, the bottom 16 of housing 12 may be made of injection-molded plastic. The use of electrical conductors for the material for bottom 14 and bottom 16, in conjunction with an electrically conductive connection assembly, establishes a common electrical ground for housings 10 and 12, and the electrical assemblies housed therein. In the alternative, a common ground can be established when bottom 16 of housing 12 is comprised of plastic by using an electrically conductive connection assembly in conjunction with a conductive receptacle mounting screw 50 providing access to the interior electronic assemblies of housing 12.

The top 18 of housing 10 and the top 20 of housing 12 mate to the bottom 14 and bottom 16 of housings 10 and 12, respectively. The top 18 and the top 20 in the preferred embodiment are made of ten percent glass-filled polycarbonate. The front 22 of housing 10 and the front 24 of housing 12 are shown to the right in FIG. 1. Key aperture 26 is shown in the side of housing 10. Key aperture 28 is shown in the side of housing 12. When housing 12 and housing 10 are connected together with the quick connect housing coupling system, key aperture 26 is covered by housing 12. The need to periodically access key aperture 26, for example to insert an appropriate security key, is one reason a user-friendly quick connect/disconnect system for housing 12 is necessary.

As shown in the preferred embodiment in FIG. 1, electrical cable 30 and telephone wire 35 emanate from a side of housing 12, and provide the electrical connections necessary to electrically interface the electrical assembly of the SFM within housing 12 to the electrical assembly of the MMT telephone within housing 10. At the end of electrical cable 30 is connector 32 which mates with receptacle 34 (the cable 30 connector 32 receiver) in housing 10 when housings 10 and 12 are coupled together. Similarly, at the end of telephone wire 35 is plug 36 which mates with jack 38 in housing 10 when housings 10 and 12 are coupled adjacent to one another. The electrical connections would generally be performed after the mechanical coupling described below takes place.

Bracket 40 provides the structural support and the mechanical platform upon which the coupling system depends. Bracket 40 in the preferred embodiment comprises carbon steel, which is strong, yet relatively inexpensive and easy to fabricate into the appropriate shape and is electrically conductive. The bracket 40 in the preferred embodiment couples the bottom 14 of housing 10 and the bottom 16 of housing 12, but the bracket 40 could easily couple the backs or other portions of housings 10 and 12. The general shape of bracket 40 is a generally flat plate in a "U" shape, with the center area of the "U" shape open to accommodate electrical cable 30 and telephone wire 35 as they pass between housings 10 and 12 in the coupled configuration. Bracket edge 41 can be bent to accommodate the shape of the bottom 14 and the bottom 16 of housings 10 and 12, respectively.

Bracket 40 has a number of holes to accommodate fasteners to both housings 10 and 12. Holes 56 can be countersunk to accommodate fasteners, such as self-threading screws 58, which screw into corresponding holes in housing 10. Holes for screws 58 can be created during the casting of bottom 14 of housing 10. Although a screwdriver is required for fastening the bracket 40 to the housing 10 with screws 58, such an operation would be a one-time event at the factory, or by the user. Subsequent couplings and decouplings of the housing 10 and the housing 12 (or alternate housings) do not require any further operations with screws 58.

Bracket 40 also contains several holes which are important in aligning housing 10 to and latching onto housing 12. Holes 60 in bracket 40 align with and fit over shear bosses 54 on the bottom 16 of housing 12 when housing 12 is positioned immediately adjacent to housing 10 in the position in which housing 12 is to be latched. Similarly, aperture 48 in bracket 40 accommodates slide latch receptacle 52 when housing 12 is positioned in latching position. Slide latch receptacle 52 is attached to bottom 16 of housing 12 by receptacle mounting screw 50.

Slide latch plate 42 is fastened to bracket 40 in FIG. 1 with fasteners 44. Fasteners 44 in the preferred embodiment shown are rivets. Slide latch plate 42 includes an aperture 48 which matches the corresponding aperture 48 in bracket 40. Slide latch fingers 46 are restrained to slide along slide latch plate 42 by slide latch guides 49. Slide latch fingers 46 can be moved across opposite portions of the edge of aperture 48 by sliding slide latch handle 47 toward the front 24 of housing 12.

When the slide latch fingers 46 in FIG. 1 are withdrawn from the edges of aperture 48 and the housing 12 is positioned immediately adjacent to housing 10 in the position in which housing 12 is to be latched, the slide latch receptacle 52, affixed to the bottom 16 of housing 12, protrudes through aperture 48. The slide latch handle 47 can then be pushed toward the front 24 of housing 12 until the slide latch fingers 46 spread sufficiently to latch onto the slide latch receptacle 52. Housing 12 is then rigidly interlocked to housing 10, with the shear bosses 54 and holes 60 providing alignment of housing 10 and housing 12, the bracket 40 providing support (when the housing 10 and housing 12 are in their normal upright position) and the slide latch fingers 46 and slide latch receptacle providing the secure mechanical latching of housing 10 to housing 12.

The slide latch assembly comprising slide latch plate 42, slide latch fingers 46, slide latch handle 47, slide latch guides 49, and slide latch receptacle 52 is available commercially from Dzus Fastener Company in West Islip, N.Y.

Figure 2:
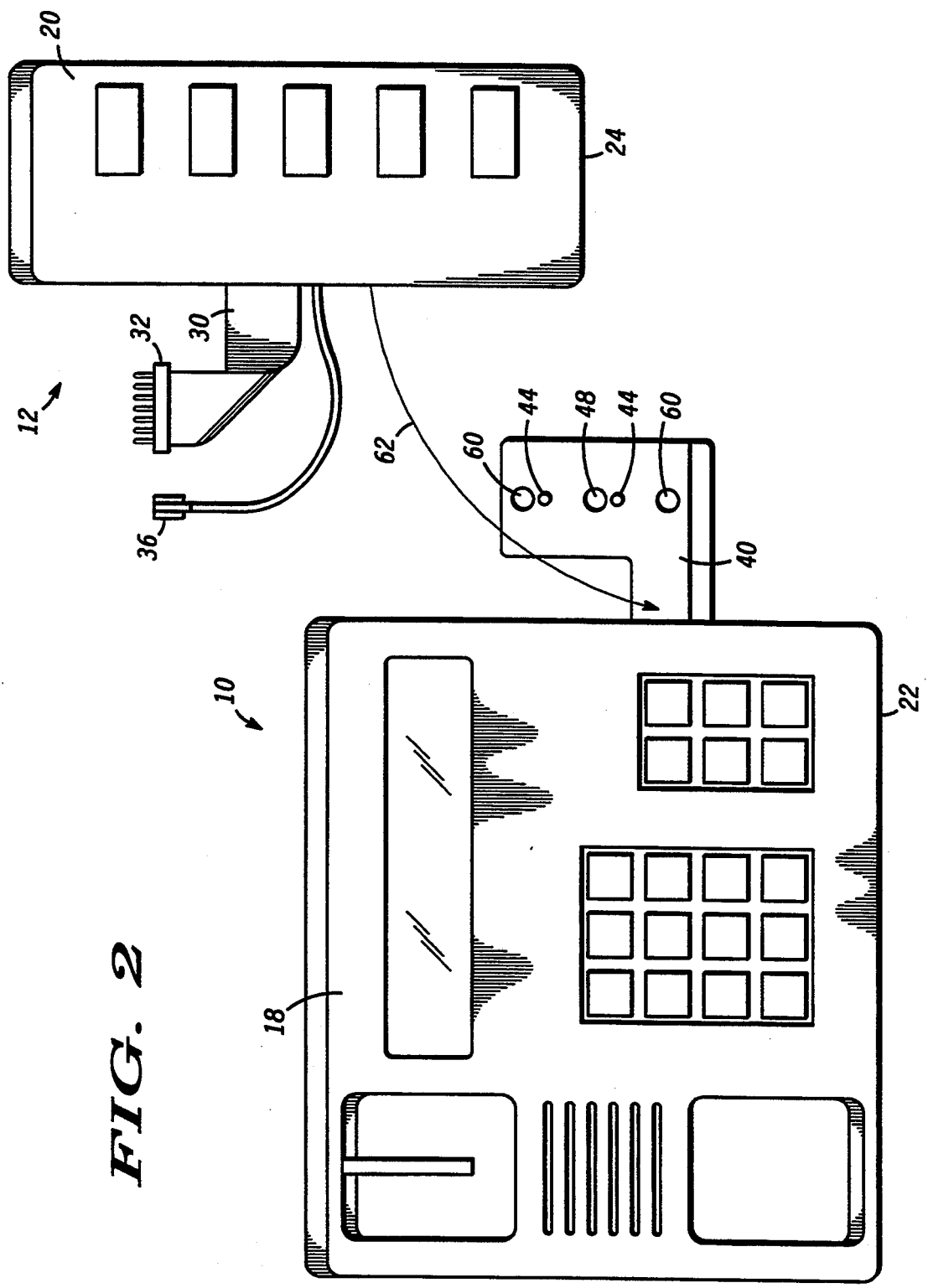
In FIG. 2, there is shown a top view of the quick connect housing coupling and method illustrated in FIG. 1 applied to connection of a telephone with a SFM.

In FIG. 2, there is shown a top view of the quick connect system and method illustrated in FIG. 1 applied to connection of two housings comprising a telephone and a SFM. FIG. 2 illustrates the housing 10 with the bracket 40 already attached to housing 10. Shown in FIG. 2 are housings 10 and 12, the front 22 of housing 10 and the front 24 of housing 12, the top 18 of housing 10 and the top 20 of housing 12, and the portion of bracket 40 which extends beyond housing 10 including holes 60, aperture 48, and fasteners 44. In FIG. 2, the slide latch receptacle 52 of FIG. 1 is shown already attached to the bottom 16 of housing 12. Thus, in FIG. 2, housing 12 is shown ready to be coupled to housing 10 using the self-aligning, quick-connect slide latch system.

Arrow 62 in FIG. 2 shows the direction in which housing 12 should be moved into latching position relative to housing 10. Note that the "U" shape of bracket 40 accommodates electrical cable 30 and telephone wire 35 from housing 12 as housing 12 is positioned for latching. Housing 12 is slid into position along the direction of arrow 62, maintaining the top 20 of housing 12 slightly higher than the top 18 of housing 10, enabling the shear bosses 54 and slide latch receptacle 52 (shown in FIG. 1) to clear bracket 40. When the front 24 of housing 12 is slid forward sufficiently to align with the front 22 of housing 10, housing 12 is lowered so that the top 20 of housing 12 aligns with the top 18 of housing 10. The housings 10 and 12 are the same height and housing 12 is thereby lowered into latching position, with (see FIG. 1) shear bosses 54 inserted into holes 60 and slide latch receptacle 52 inserted through aperture 48. The latching step comprises sliding the slide latch handle 47 toward the front 24 of housing 12 until the slide latch fingers 46 lock onto the slide latch receptacle 52 of the housing 12.

Thus, once bracket 40 has been attached to housing 10 and slide latch receptacle 52 has been attached to housing 12, all that is required to electrically and mechanically couple housings 10 and 12 is the following: to position housing 12 relative to housing 10 as shown in FIG. 2 (moving housing 12 forward and down relative to housing 10, with housing 12 self-aligning relative to housing 10), to reach under housing 12 to push the slide latch handle 27 (see FIG. 1) forward, latching housing 12 to housing 10, and then to turn over the coupled housings 10 and 12 to plug connector 32 into receptacle 34 and plug 36 into jack 38. The simple steps may easily be reversed to unlock and decouple housings 10 and 12.

Thus, a quick-connect housing coupling and method has been described which overcomes specific problems and accomplishes certain advantages relative to prior art methods and mechanisms. The improvements over known technology are significant. Both the method and apparatus are user-friendly and do not require complicated instructions. Coupling and decoupling can be accomplished quickly, and in semi-blind fashion (mechanically latching and unlatching from the underside of the housings 10 and 12 without looking at the slide latch handle 47).

Thus, there has also been provided, in accordance with an embodiment of the invention, a quick-connect housing coupling and method that fully satisfies the aims and advantages set forth above. While the invention has been described in conjunction with a specific embodiment, many alternatives, modifications, and variations will be apparent to those of ordinary skill in the art in light of the foregoing description. Accordingly, the invention is intended to embrace all such alternatives, modifications, and variations as fall within the spirit and broad scope of the appended claims.

What is claimed is:

1. A quick connection system for coupling a first housing to a second housing, the quick connection system comprising:
    a bracket having at least one hole, the bracket comprising a slide latch having a slide latch aperture, wherein the bracket is fastened to a base of the first housing and extends beyond a side of the first housing such that the slide latch and at least one hole overlap the second housing when the second housing is placed adjacent to the first housing;
    at least one shear boss affixed to the second housing; and
    a slide latch receptacle mounted to the second housing, such that the at least one hole in the bracket receives the at least one shear boss and the slide latch on the bracket receives the slide latch receptacle when the second housing is placed adjacent to the first housing and the slide latch is engaged by sliding, to rigidly interlock the first housing to the second housing.

2. A quick connection system as claimed in claim 1, wherein the first housing comprises a cable connector receiver and the second housing comprises an electrical cable ending in a cable connector.

3. A quick connection system as claimed in claim 2, wherein the bracket is comprised of an electrically conductive, substantially flat plate.

4. A quick connection system as claimed in claim 3, wherein the bracket is further configured in a "U"-shape to accommodate the electrical cable.

5. A quick connection system as claimed in claim 1, wherein the bracket is fastened to the base of the first housing by a plurality of screws, the slide latch receptacle is fastened to the second housing by a screw, and the slide latch is fastened to the bracket by a plurality of rivets.

6. A connection system for coupling a telephone to a special function module (SFM), the connection system comprising:
    a bracket having at least one hole, the bracket comprising a slide latch having a slide latch aperture, wherein the bracket is fastened to a base of the telephone and extends beyond a side of the telephone such that the slide latch and the at least one hole overlap the SFM when the SFM is placed adjacent to the telephone;
    at least one shear boss affixed to the SFM; and
    a slide latch receptacle mounted to the SFM, such that the at least one hole on the bracket receives the at least one shear boss and the slide latch on the bracket receives the slide latch receptacle when the SFM is placed adjacent to the telephone and the slide latch is engaged by sliding, to rigidly interlock the telephone to the SFM.

7. A quick connection system as claimed in claim 6, wherein the telephone comprises a cable connector receiver and the SFM comprises an electrical cable ending in a cable connector.

8. A quick connection system as claimed in claim 7, wherein the bracket is comprised of an electrically conductive, substantially flat plate.

9. A quick connection system as claimed in claim 8, wherein the bracket is further configured in a "U"-shape to accommodate the electrical cable.

10. A quick connection system as claimed in claim 6, wherein the base of the telephone comprises cast aluminum.

11. A quick connection system as claimed in claim 6, wherein the bracket is fastened to the base of the telephone by a plurality of screws and the slide latch receptacle is mounted to the SFM by a screw.

12. A quick connection system as claimed in claim 6, wherein the slide latch is fastened to the bracket with a plurality of rivets.

13. A method for coupling a first housing to a second housing, the method comprising the steps of:
    providing a bracket affixed to the first housing, the bracket having a first hole and a second hole, the bracket positioned such that a slide latch affixed to the bracket adjacent to the second hole, the first hole, and the second hole extend beyond a side of the first housing;
    positioning the second housing relative to the first housing such that a shear boss and a slide latch receptacle, each affixed to the second housing, align with the first hole and the second hole, respectively, of the bracket;
    positioning the second housing relative to the first housing such that the shear boss is inserted into the first hole and the slide latch receptacle is inserted through the second hole; and
    sliding the slide latch so that a portion of the slide latch engages the slide latch receptacle extending through the second hole, thereby mechanically locking the first housing adjacent to the second housing.

14. A method as claimed in claim 13, further comprising the step of fastening the bracket to the first housing.

15. A method as claimed in claim 13, further comprising the step of coupling a first electrical connector from the first housing to a second electrical connector from the second housing, thereby electrically coupling the first housing to the second housing.

16. A method for coupling a telephone to a special function module (SFM) for a telephone, the method comprising the steps of:
    fastening a bracket to a first housing, the bracket having a first hole and a second hole, the bracket positioned such that a slide latch affixed to the bracket adjacent to the second hole, the first hole, and the second hole extend beyond a side of the first housing;

positioning the second housing relative to the first housing such that a shear boss and a slide latch receptacle, each affixed to the second housing, align with the first hole and the second hole, respectively, of the bracket;

positioning the second housing relative to the first housing such that the shear boss is inserted into the first hole and the slide latch receptacle is inserted through the second hole; and sliding the slide latch so that a portion of the slide latch engages the slide latch receptacle extending through the second hole, thereby mechanically locking the first housing adjacent to the second housing.

17. A method as claimed in claim 16, further comprising the step of coupling a first electrical connector from the telephone housing to a second electrical connector from the SFM, thereby electrically coupling the telephone to the SFM.

18. A method for decoupling a first housing latched adjacent to a second housing, wherein a bracket is affixed to the first housing, the bracket having a first hole, a second hole, and a slide latch, and wherein the slide latch is affixed to the bracket adjacent to the second hole, and the slide latch, the first hole, and the second hole extend beyond a side of the first housing to where the slide latch couples to a slide latch receptacle affixed to the second housing, the method comprising the steps of:

unlocking the slide latch from the slide latch receptacle, wherein the slide latch receptacle is released from its position extending through the second hole, and wherein the unlocking releases the first housing from the second housing; and lifting the second housing to remove a shear boss affixed to the second housing from the first hole and the slide latch receptacle from the second hole where the shear boss and slide latch receptacle provided alignment of the first housing to the second housing, whereby the step of lifting mechanically decouples the first housing from the second housing.

19. A method for decoupling as claimed in claim 18 which further comprises the step of disconnecting a first electrical connector emanating from the first housing from a second electrical connector emanating from the second housing, thereby electrically decoupling the first housing from the second housing.

* * * * *